United States Patent
Carmeli et al.

[11] Patent Number: 6,061,182
[45] Date of Patent: May 9, 2000

[54] COMBINER FOR SUPERIMPOSING A DISPLAY IMAGE ON TO AN IMAGE OF AN EXTERNAL SCENE

[75] Inventors: Ran Carmeli, Magshimim; Omer Bar-Lev, Kochav Yair; Uri Greisman, Modiin, all of Israel

[73] Assignee: Vectop Ltd., Rosh Ha'Ayin, Israel

[21] Appl. No.: 08/990,082

[22] Filed: Dec. 12, 1997

Related U.S. Application Data

[63] Continuation-in-part of application No. 08/754,812, Nov. 21, 1996, Pat. No. 5,742,434.

[30] Foreign Application Priority Data

Jun. 9, 1997 [IL] Israel ......................................... 121042

[51] Int. Cl.⁷ .................................................. G02B 27/14
[52] U.S. Cl. ........................................... 359/629; 359/640
[58] Field of Search ..................................... 359/630, 631, 359/618, 368, 629, 640, 634, 638, 639

[56] References Cited

U.S. PATENT DOCUMENTS

| | | |
|---|---|---|
| 4,398,799 | 8/1983 | Swift . |
| 4,407,272 | 10/1983 | Yamaguchi . |
| 4,516,157 | 5/1985 | Campbell . |
| 4,518,230 | 5/1985 | Weber . |
| 4,629,295 | 12/1986 | Vogl . |
| 4,732,438 | 3/1988 | Orbach et al. . |
| 4,818,065 | 4/1989 | Ziph et al. . |
| 4,828,378 | 5/1989 | Ellis . |
| 5,113,177 | 5/1992 | Cohen . |
| 5,162,828 | 11/1992 | Furness et al. . |
| 5,341,242 | 8/1994 | Gilboa et al. . |

FOREIGN PATENT DOCUMENTS

| | | |
|---|---|---|
| 0381449 | 8/1990 | European Pat. Off. . |
| 1335360 | 10/1973 | United Kingdom . |
| 2149933 | 6/1985 | United Kingdom . |

*Primary Examiner*—Hung Xuan Dang
*Attorney, Agent, or Firm*—Browdy and Neimark

[57] ABSTRACT

An optical combiner for use with an optical eyepiece which is adjusted for viewing a first image, and which injects a non-collimated light beam from a second image substantially along an optical axis of the eyepiece so as to present a combined image to an observer. The combiner comprises a beam splitter for inserting into the eyepiece and having an entry aperture for intercepting the non-collimated light beam and directing a portion thereof outside the eyepiece so as to superimpose the second image on the first image.

23 Claims, 6 Drawing Sheets

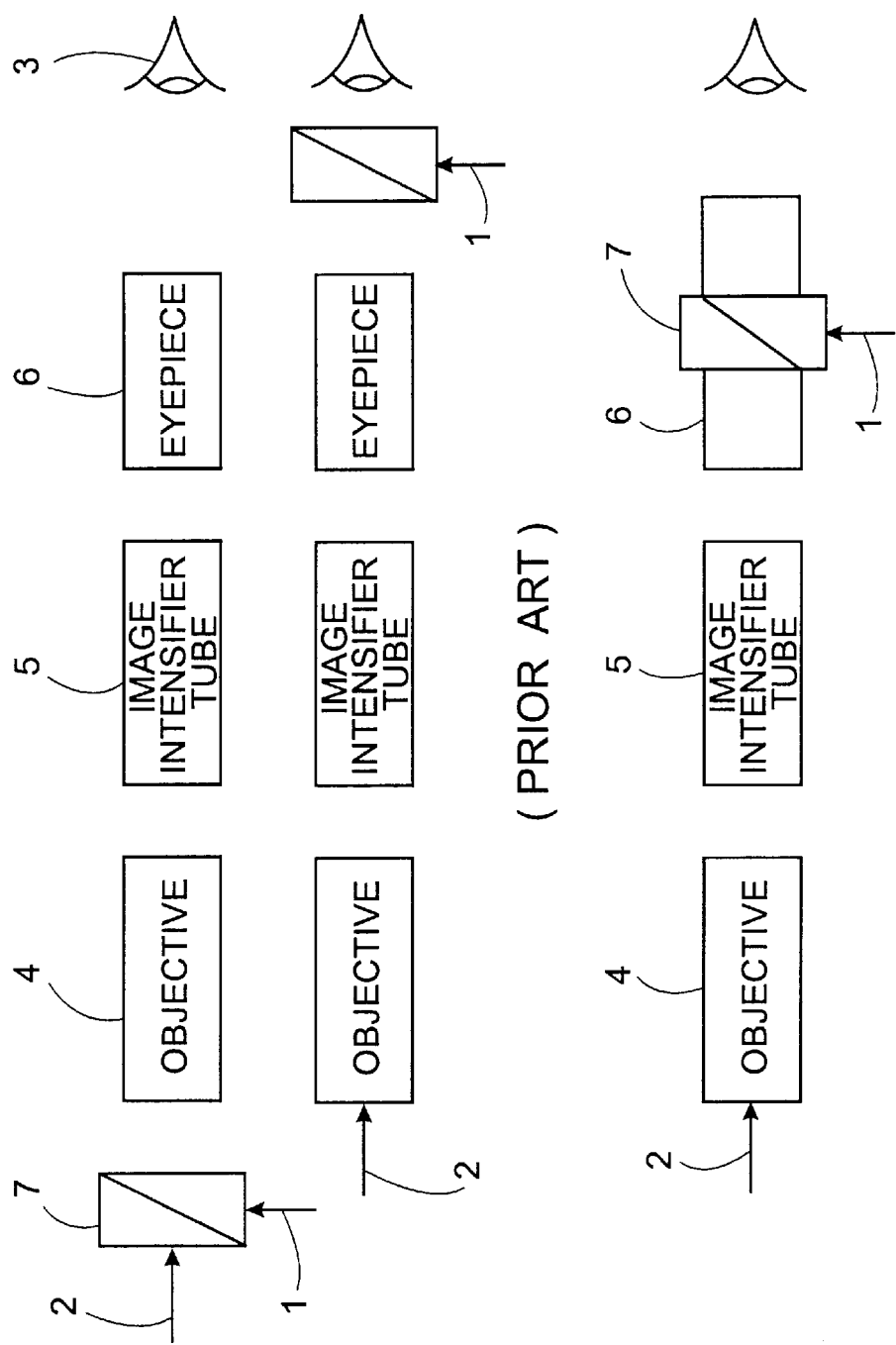

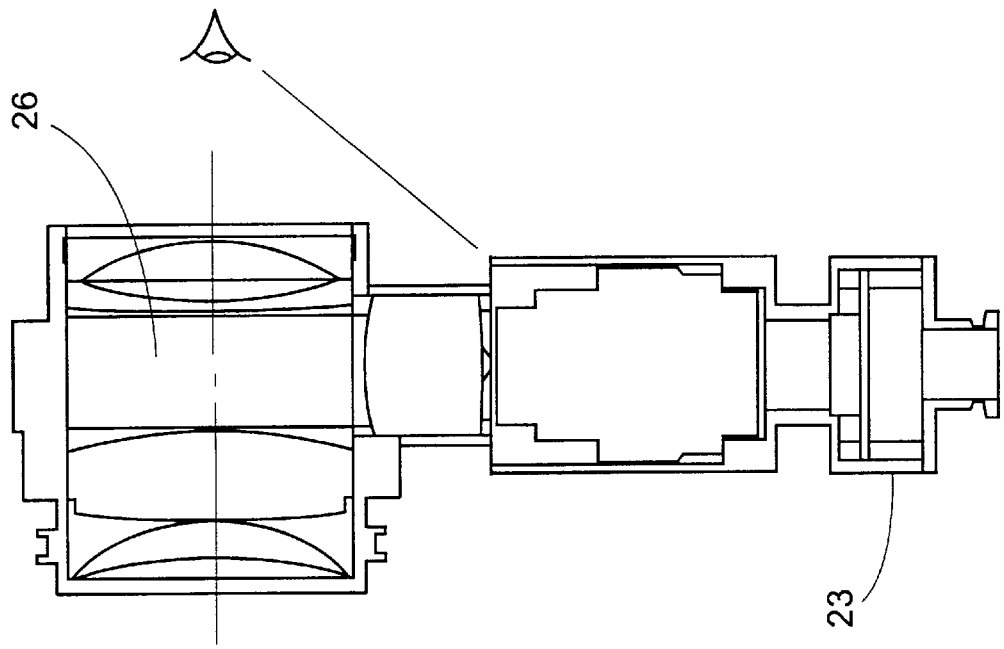
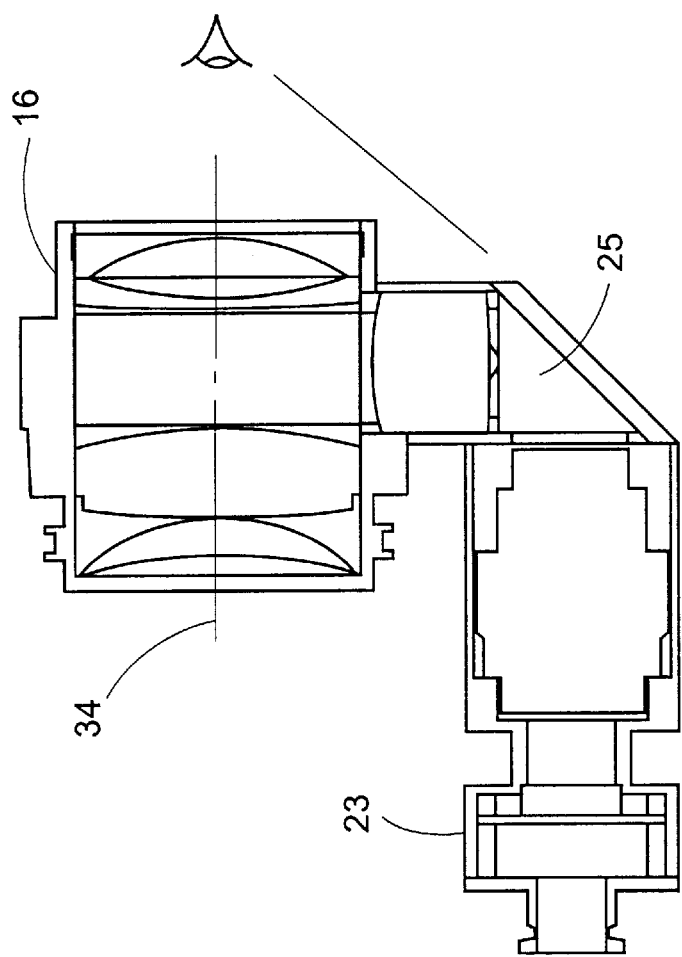
Fig. 4b
Fig. 4a

COMBINER FOR SUPERIMPOSING A DISPLAY IMAGE ON TO AN IMAGE OF AN EXTERNAL SCENE

RELATED APPLICATION

This application is a continuation-in-part of U.S. Ser. No. 08/754,812 entitled "Adapter for extracting a portion of an image from an optical system or device" filed on Nov. 21, 1996 and assigned to the present assignee now U.S. Pat. No. 5,742,434.

FIELD OF THE INVENTION

This invention relates in general to optical beam splitters and, more particularly, to a combiner for superimposing a display image on to an image of an external scene.

BACKGROUND OF THE INVENTION

It is sometimes required to superimpose an optical image derived electronically on to an external scene viewed through an eyepiece by an observer so that the observer can see both the electronic image as well as the external scene together. This requirement has been addressed in the prior art so as to permit, for example, a pilot to see flight data superimposed on an external scene.

U.S. Pat. No. 5,162,828 (Furness et al.) discloses a display system for conventional spectacles having a transparency that defines a field of view and a frame for supporting the transparency on a user's head. The display system includes a display mounted on the frame of the spectacles and optics for collimating light to project an image of the displayed information at a distance from the user in the periphery of the field of view defined by the transparency. According to one embodiment, the optics includes a single mirror which receives the information directly from the display and projects an enlarged image at an apparent optical distance from the user that is greater then the actual optical path length. Alternatively, a planar mirror and collimating lens may be employed.

U.S. Pat. No. 4,516,157 (Campbell) discloses a portable video recording device arranged to be worn by the user like a pair of spectacles. In the recording mode, the scene in front of the user is recorded on a miniature video camera mounted on the spectacle frame, allowing the user to view the scene normally, and also examine a viewfinder showing the portion of the scene available to the video camera. This enables the user to perform hands free photography.

A principal application of the device disclosed by Campbell is for detectives and the like to record situations unbeknown to a subject being photographed. To this end, miniature CCD elements and minimal optics are mounted behind a partially silvered spectacle frame so to be undetectable from the front of the spectacle frame. In order that the user may know accurately the field of view seen by the camera, a rectangular frame is provided on an inside surface of one of the spectacle lenses and the camera optics are pre-calibrated so as to focus on an external scene which is also seen by the user within the frame.

Such systems are commonly mounted on, or in conjunction with, a pilot's head up display and typically employ a miniature CCD TV camera mounted either on the head up display or to a visor thereof. For example, U.S. Pat. No. 5,341,242 to Gilboa et al. discloses an optical projector which projects an image on to the semi-transparent portion for reflection from it. The semi-transparent portion has a relatively higher reflectivity in a central area and a relatively lower reflectivity in an annular area outside the central area. In accordance with one embodiment, the head mounted display includes a projector having a display source where an image is formed. An optical system for focusing the image at separate sagittal and tangential foci is provided between the image-forming surface and the semi-transparent portion. Such an arrangement may be employed in a visor attached to a pilot's helmet, such that the visor has a partially reflecting semi-transparent portion in view of the pilot.

U.S. Pat. No. 4,398,799 (Swift) discloses a pilot's head-up display wherein an image of selected display information is superimposed by means of a combiner on an external scene and reflected towards the pilot's eyes by means of a mirror disposed on his helmet in such a manner so as to not to interfere with his vision.

U.S. Pat. No. 5,113,177 (Cohen) discloses a display system for enabling a pilot in an aircraft to view simultaneously an image of selected display information and a scene external to the aircraft during low visibility conditions, such as a night-time. An image intensifier tube is mounted on the side of a pilot's helmet so that the image sensed coincides with the pilot's field of view. The image intensifier tube intensifies light from the external scene and output voltages representative of the scene to a converter whose output is itself converted to a suitable video signal. A combining circuit combines the video signal with video signals from other sources, such as instrumentation panel displays. The combined electrical signals are fed to a display driver so as to allow superimposition of the selected display information on the external scene viewed by the pilot.

In the above systems described by Gilboa et al, Swift and Cohen and in all similar systems, the projected image is collimated so that the physical location of the projector relative to the visor is not critical.

U.S. Pat. No. 4,818,065 (Ziph) discloses an optical device particularly useful as a night vision goggles including an objective lens which is located remote from the viewer's eye for viewing a scene, and a cathode ray tube and prism assembly for injecting additional information into the viewed scene. Since the objective lens is adjusted to view the scene from infinity or near infinity, the incoming light must be near collimated. U.S. Pat. No. 4,629,295 (Vogl) discloses a night vision instrument which may be located beside an ordinary telescope eyepiece or TV camera so as to enable the telescope eyepiece or TV camera to be used during night time. A light gathering objective lens is provided having therein a concave mirror for imaging light rays from a scene towards an entrance surface of the image intensifier tube and an opposite exit surface for directing an intensified image via a first reflecting surface through a collimator and a second reflecting surface towards the telescope eyepiece. The second reflecting surface may, if desired, be a beam splitter so as to direct a part of the intensified image towards the eyepiece whilst allowing transmission of a portion of the intensified beam through the beam splitter towards the television camera mounted outside the objective.

It is thus to be noticed that, in the device proposed by Vogl, an external television camera may be effectively coupled, via a beam splitter, to an objective lens. Further, since the intensified image beam is directed through a collimator towards the beam splitter, the beam splitter sees a collimated beam suitable for viewing by a conventional infinite conjugate. Thus, in particular, it is to be noted that the arrangement disclosed by Vogl allows for the beam splitter to intercept a collimated beam and allows the beam splitter to be disposed in conjunction with an objective lens so as to couple the intensified image beam produced thereby to an eyepiece. There is also disclosed the possibility of allowing the beam splitter to direct a daylight image of a scene directly to the telescope eyepiece at the same time as the intensified night vision is directed thereto via the objective lens. However, even in this case, the beam splitter directs a conventional collimated beam to the eyepiece. Moreover, since the beam splitter is disposed outside of the eyepiece and, in fact, outside of the objective lens also, there are no limiting constraints on the physical separation of the beam splitter from either of these elements apart, of course, from the obvious requirement to avoid rendering the device unduly bulky.

FIGS. 1a and 1b show schematically prior art approaches for superimposing a display image 1 on an image of an external scene 2 so as to be viewed simultaneously by an observer 3. Common to both approaches is a light gathering objective lens 4, an image intensifier tube 5 or a similar device and an eyepiece 6. A beam splitter 7 combines light from the display image 1 with the external scene 2 so as to direct a combined image to the observer 3. In both arrangements, the image intensifier tube 5 is pre-calibrated so that its output is fairly constant.

The arrangement shown in FIG. 1a is similar to that taught by Ziph and described above. The beam splitter 7 is disposed before the light gathering objective lens 4 so that the display image 1 as well as the external scene 2 are both directed to the image intensifier tube 5 and amplified thereby. This arrangement suffers from the drawback that if the contrast between the brightness of the two images is high, then the low brightness component will be swamped by the bright component so as to be barely amplified by the image intensifier tube 5 in order to maintain the required constant brightness at its output. Consequently, the low brightness component will be barely visible to the observer 3. In order to compensate for this, the display image 1 must be monitored so as to render its brightness of a similar order to that of the external scene 2. Furthermore, since the external scene 2 effectively emanates from infinity, the beam splitter 7 sees a collimated beam suitable for viewing by a conventional infinite conjugate.

The arrangement shown in FIG. 1b is similar to that taught by Vogl and described above, in that the beam splitter 7 is placed after the eyepiece 6 so that only the external scene 2 is intensified prior to combining with the display image 1. This arrangement overcomes the problem of high brightness contrast associated with the arrangement shown in FIG. 1a. However, it requires that the beam splitter 7 be disposed between the eyepiece 6 and the eyes of the observer 3, thereby decreasing the eye relief and reducing comfort to the observer 3. Here also, as noted above with regard to Vogl, the beam splitter 7 intercepts the collimated beam produced by the objective lens 4 and amplified by the image intensifier tube 5 so as to superimpose the display image on the intensified image produced thereby.

Common to all such systems is that they employ an infinite conjugate which forms a collimated virtual image of a distant object. Since the image beam is collimated, the beam splitter can be disposed anywhere in the optical path of the image beam in order to achieve the required effect.

However, optical systems are also known which form a real image on a screen close to the eyes of the observer, and in such systems the image beam does not emanate from infinity and so is not collimated. Furthermore, such systems are usually compact, and it is therefore inherently more difficult to intercept the image beam so as to superimpose thereon a display image which is injected through the beam splitter.

One system which produces a real image of a distant object is a pair of Night Vision Goggles. Such goggles comprise, for each eye of the observer, an objective lens for imaging a distant object so as to form an image beam and an image intensifier tube which intercepts the image beam, converts the light to electrons and then amplifies the number of electrons. A phosphor captures the electrons so as to generate an amplified image which is viewed by an observer through a suitable eyepiece mounted proximate the image intensifier tube so that the phosphor is in the focal plane of the eyepiece.

Night vision goggles are compact and it is difficult both physically and optically to inject the image owing to the compactness of the eyepiece, particularly if optical distortions are to be avoided or at least compensated for.

Yet another consideration is that because space within the eyepiece is invariably at a premium, a beam splitter, for example, disposed therein in order to combine the eyepiece beam with the display image must be asymmetrical in order to maximize transmission of light through the eyepiece whilst still allowing the display beam to be injected without diminishing the field of view. Eyepieces of the kind generally used in night vision systems are usually provided with a wide angle so as to provide an increased field of view. Wide angle coverage is usually accomplished by providing several optical elements any pair of which are necessarily close to each other. It is into the limited space between these optical elements that any beam splitter must be disposed in order to allow superimposition of the display beam on to eyepiece image. If, for example, the aperture of the lens is in the order of 30 mm whilst the space between the optical elements is in the order of 10 mm, then a symmetrical beam splitter having equal dimensions in the order of 10 mm disposed symmetrically in the light path of the eyepiece, would intercept incoming light only within a 5 mm radius of the optical axis and there would be an annular portion having a width of 10 mm surrounding the beam splitter where light would pass directly through the eyepiece without passing through the beam splitter. This is unacceptable because it would introduce severe optical distortions in the eyepiece which would be most difficult to correct. Equally, it is unacceptable to block out the surrounding annular portion since this would drastically reduce both the field of view and the quantity of light passing through the eyepiece and is therefore obviously unacceptable during night time vision when, in any case, the quantity of light is limited. These considerations dictate the use of an asymmetric beam splitter which is, of course, distinguished from prior art designs of the kind discussed where, to the extent that beam splitters are used at all, they are invariably symmetrical.

SUMMARY OF THE INVENTION

It is a principal object of the invention to provide a beam splitter in a finite conjugate which propagates a non-collimated first image beam so as to allow injection into the finite conjugate of a second image which may thus be superimposed on the first image for viewing by an observer.

According to a broad aspect of the invention there is provided for an optical eyepiece which is adjusted for viewing a first image, a combiner for injecting a non-collimated light beam from a second image substantially along an optical axis of the eyepiece so as to present a combined image to an observer, said combiner comprising a beam splitter for inserting into the eyepiece and having an entry aperture for intercepting the non-collimated light beam and directing a portion thereof outside the eyepiece so as to superimpose the second image on the first image.

Preferably, the combiner further includes optical correction means for correcting for optical distortions produced consequent to inserting the beam splitter into the eyepiece, a collimating lens disposed proximate an entry aperture of the beam splitter for collimating said portion of the light beam so as to produce a collimated exit beam, and optical folding means for intercepting the non-collimated beam and folding the non-collimated beam through 90° so as to produce a folded exit beam.

Preferably, the first and second images are of different color spectra and a dichroic coating is applied to the beam splitter in order that the beam splitter be fully transparent to the first image and fully reflective to the second image. This avoids attenuation of the second image which would otherwise occur owing to only partial reflection thereof by the beam splitter.

In such an adapter, the exit beam is parallel to the optical axis of the eyepiece and allows for the adapter to add minimal additional bulk to the eyepiece. This is of particular importance in optical systems which are designed to be portable and compact, such as Night Vision Goggles.

In accordance with a preferred embodiment of the invention, there is provided an optical system comprising:
   a Night Vision Goggles having mounted in at least one eyepiece thereof for viewing a first image, a combiner comprising a beam splitter for inserting into the eyepiece so as to intercept a non-collimated light beam from a second image and direct a portion thereof through an exit aperture of the beam splitter outside the eyepiece so as to superimpose the second image on the first image,
   optical correction means associated with the beam splitter for correcting for optical distortions produced consequent to inserting the beam splitter into the eyepiece,
   an objective lens for intercepting and collimating the non-collimated beam so as to produce a collimated entry beam,
   optical folding means for intercepting and folding the collimated beam through 90° so as to produce a folded and collimated entry beam,
   an imaging lens disposed intermediate the objective lens and an entry aperture of the beam splitter for focussing said folded and collimated entry beam so as to produce a non-collimated entry beam, and
   an illumination sub-unit mounted in a focal plane of the imaging lens for producing said non-collimated light beam.

BRIEF DESCRIPTION OF THE DRAWINGS

In order to understand the invention and to see how it may be carried out in practice, a preferred embodiment will now be described, by way of non-limiting example only, with regard to a combiner for inserting into at least one eyepiece of a Night Vision Goggles and with reference to the accompanying drawings, in which:

FIGS. 1a and 1b are schematic diagrams showing optical constructions of prior art optical combiners;

FIG. 1c is a schematic diagram showing the fundamental distinction of an optical combiner according to the invention over the designs shown in FIGS. 1a and 1b;

FIGS. 4a and 4b are pictorial representations of miniature LCDs mounted beneath the eyepiece in a Night Vision Goggles and respectively parallel and normal thereto;

DETAILED DESCRIPTION OF A PREFERRED EMBODIMENT

Figure 1D:
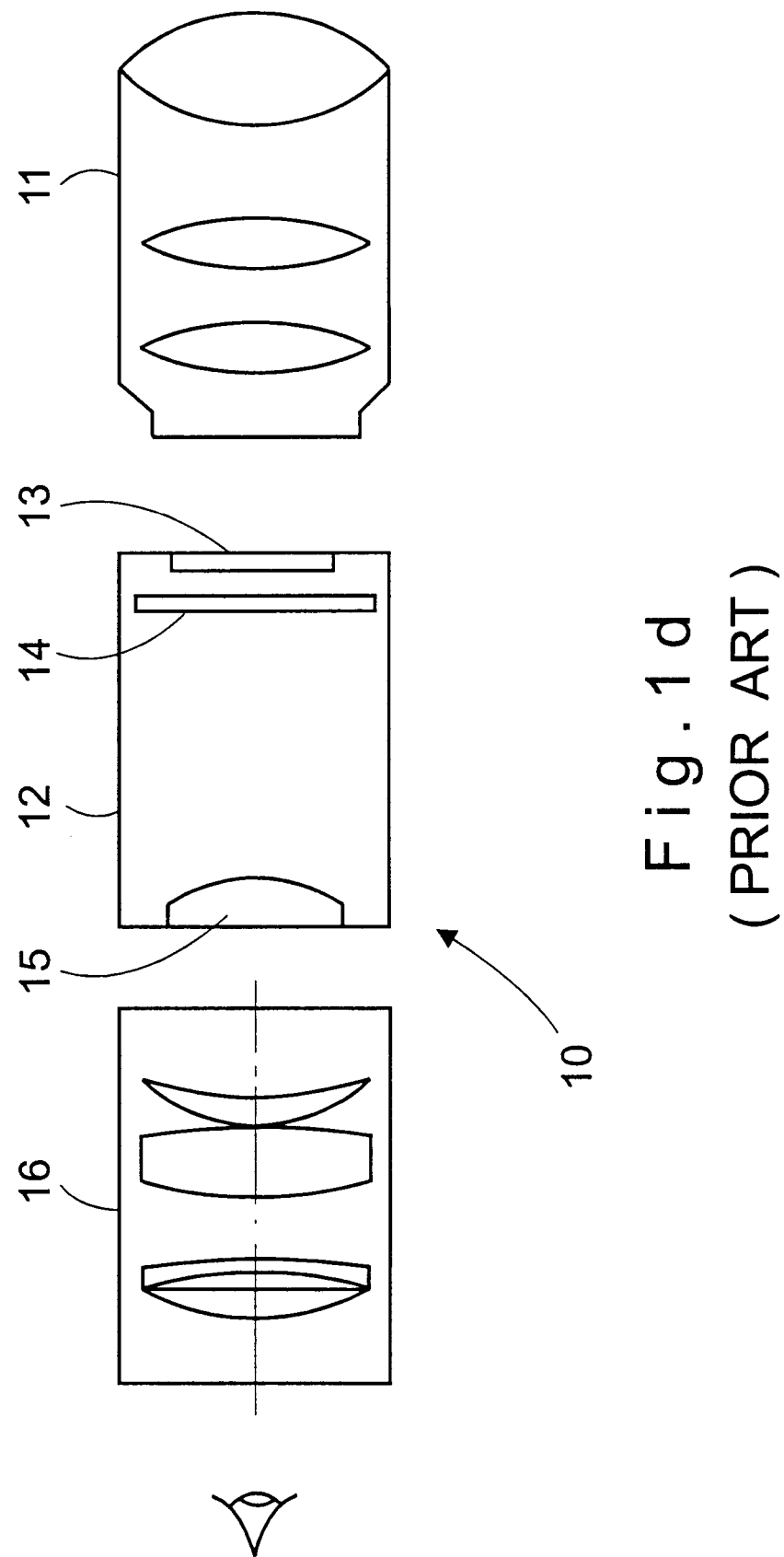
FIG. 1d is a schematic diagram showing an optical construction of a conventional Night Vision Goggles.
Figure 2:
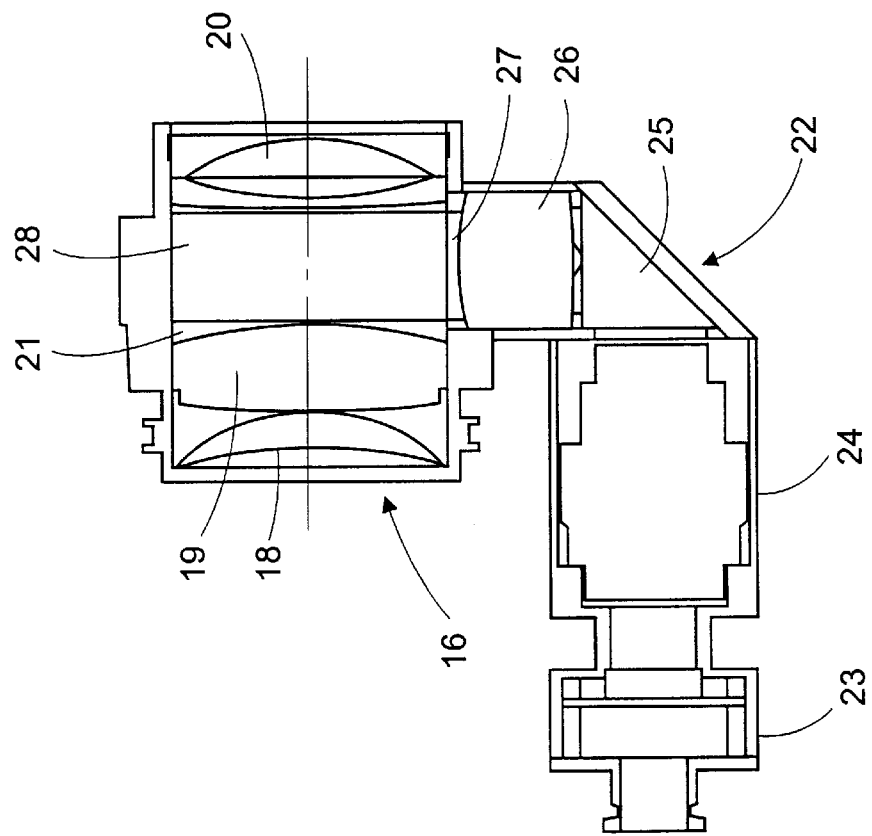
FIG. 2 is a schematic diagram of an optical construction of a modified eyepiece for use with a Night Vision Goggles.

FIG. 1c shows schematically a combiner according to the invention in a manner to emphasize its departure from the prior art arrangements depicted in FIGS. 1 and 2. Thus, as noted above, common also to the combiner according to the invention is a light gathering objective lens 4, an image intensifier tube 5 or a similar device and an eyepiece 6. A beam splitter 7 combines light from the display image 1 with the external scene 2 so as to direct a combined image to the observer 3. As before, the image intensifier tube 5 is pre-calibrated so that its output is fairly constant. However, the beam splitter 7 is disposed actually within the eyepiece 6 and consequently sees an non-collimated beam.

This distinction will now be illustrated with regard to a particular implementation of the invention using a Night Vision Goggles, and in order to describe how the combiner according to the invention is attached to an existing Night Vision Goggles, there will first be described a typical prior art construction of such a device.

Thus, FIG. 1d shows schematically an optical construction of a conventional Night Vision Goggles 10 comprising an infinite conjugate objective lens 11 for imaging a distant object so as to form an image beam (not shown) and an image intensifier tube 12 mounted proximate the objective 11. The image intensifier tube 12 includes a photo-cathode 13 typically formed of gallium arsenide for converting the image beam to electrons, and a micro channel plate 14 which receives and amplifies the number of electrons. A phosphor 15 captures the electrons so as to generate an amplified image which is viewed by an observer through a suitable eyepiece 16 mounted proximate the image intensifier tube 12 so that the phosphor 15 is in the focal plane of the eyepiece 16. As shown the eyepiece 16 includes a housing 17 containing a rear lens 18, an intermediate lens 19 and a front lens 20 although this may well vary according to design. The front lens 20 is mounted at a front of the housing 17 and the rear lens 18 is mounted towards a rear of the housing 17 with the intermediate lens 19 adjacent the rear lens 18 and substantially in contact therewith. There thus remains a gap 21 between the intermediate lens 19 and the front lens 20.

FIG. 2 shows schematically an optical construction of the eyepiece 16 having mounted therein a combiner depicted generally as 22 for allowing an image beam produced by a miniature LCD 23 to be injected into the eyepiece 16 so as to be superimposed on an external scene viewed by the observer. The combiner 22 includes an objective lens 24 mounted proximate the LCD 22 for intercepting and collimating the image beam produced thereby so as to produce a collimated beam. The resultant collimated beam is folded by a folding prism 24 (constituting an optical folding means) and then directed through an imaging lens 26 which focuses the collimated beam so as to produce a non-collimated entry beam. The entry beam is directed through an entry aperture 27 of a beam splitter 28 which is placed within the gap 21 between the intermediate lens 19 and the front lens 20 and which directs the non-collimated entry beam through the eyepiece 16 so as to be superimposed on the external scene viewed by the observer.

The beam splitter 28 includes baffles and is coated with a suitable anti-reflection (AR) coating so as to correct for optical distortions produced consequent to inserting the beam splitter 28 into the eyepiece 16. The design of the baffles and the AR coating, both of which constitute optical correction means, is not itself a feature of the invention and is well within the scope of an optical engineer. Preferably, the first and second images are of different color spectra and a dichroic coating is applied to the beam splitter in order that the beam splitter be fully transparent to the first image and fully reflective to the second image. This avoids attenuation of the second image which would otherwise occur owing to only partial reflection thereof by the beam splitter.

Optical distortions caused by the insertion of the beam splitter 28 into the eyepiece 16 may also be compensated for by replacing or modifying at least part of the existing (original) elements in the eyepiece 16. This may require, for example, that the radii of curvature of the existing optical elements in the eyepiece 16 be modified or that their mutual separation be changed so as to introduce distortions which exactly counter-balance those distortions caused by the introduction of the beam splitter 28. Likewise, the beam splitter 28 may be provided with at least one non-planar surface so as to produce distortions which, again, counter-balance those caused by its introduction into the eyepiece 16. Computer simulator programs are typically used to model optical lenses and to allow for their optimization consequent to specified optical criteria and these programs are well within the competence of an optical engineer without requiring a full description for a proper understanding of the invention.

Figure 3:
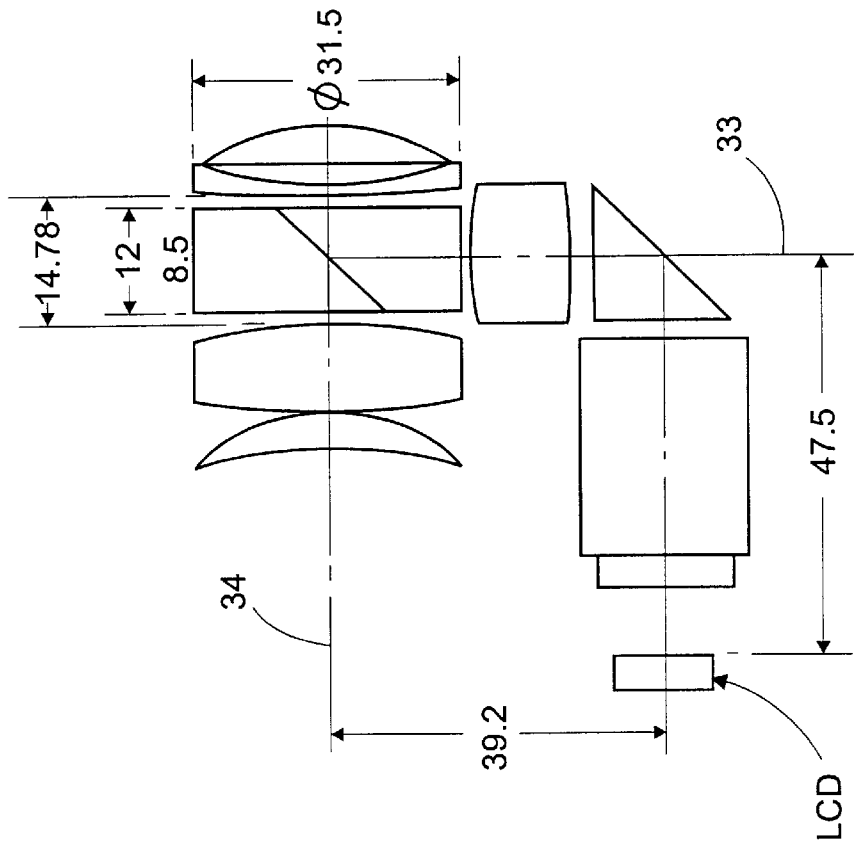
FIG. 3 is an exploded view of the arrangement shown in FIG. 2 indicating typical dimensions of the optical construction thereof.

FIG. 3 shows schematically the modified eyepiece 16 bearing typical dimensions in mm. Thus the front lens 20 has a diameter of 31.5 mm and the gap 21 has a width of 14.78 mm. The beam splitter 28 has a diameter of 12 mm and an optical axis 33 which is displaced from the LCD 23 by a distance of 47.5 mm. The eyepiece 16 has an optical axis 34 which is displaced a distance of 39.2 mm from the optical axis of the LCD 23. It will also be noted that the optical arrangement of the modified eyepiece is completely symmetrical about its optical axis 34. This permits rotation of the beam splitter 28 about the optical axis 34 without affecting in any way its optical performance and this, in turn, allows the LCD 23 to be located above or below the Night Vision Goggles 10 or to one side thereof, as required.

From a consideration of the construction shown in FIG. 3 and the dimensions therein, several advantages of the construction according to the invention emerge. First, very little bulk is added to the conventional Night Vision Goggles 10 shown schematically in FIG. 1*d*. Secondly, since the image beam within the eyepiece is folded twice: once by the beam splitter 28 and again by the folding prism 25, the resulting folded image beam is not inverted and so the image directed to the external observer and superimposed on the external scene is upright. Additionally, as explained above, rotation of the combiner 22 with respect to the eyepiece 16 adds to the convenience of the arrangement, whilst as will now be explained not unduly impairing the observer's download field of view even if the LCD 23 is mounted below the eyepiece 16.

FIGS. 4*a* and 4*b* show schematically a detail of the optical arrangement depicted in FIG. 3 with and without the folding prism 25, respectively. In FIG. 4*b*, the absence of the folding prism 25 results in the optical axis of the LCD 23 being substantially normal to the optical axis 34 of the eyepiece. The arrangement is inevitably bulkier and the LCD 23 obscures the downward field of view of the observer. Further, since the image beam is inverted once only (by the beam splitter 28), the external observer sees an inverted image.

However, when the folding prism 25 is employed, the optical axis of the LCD 23 is substantially parallel to the optical axis 34 of the eyepiece 16 resulting in a much more compact arrangement and, for the reasons set out above, ensure that the image seen by the external observer is not inverted. Moreover, the downward field of view of the observer is not impaired.

Figure 5:
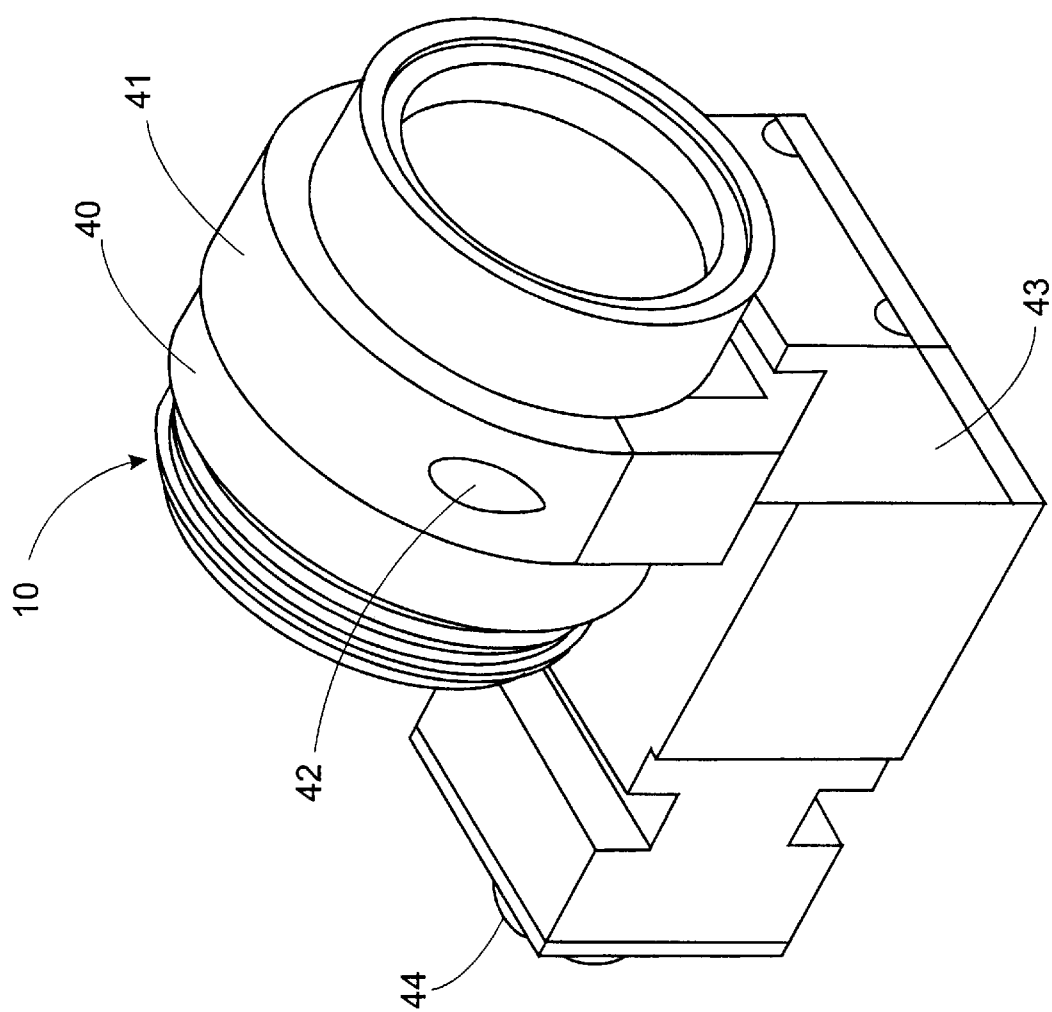
FIG. 5 is a perspective view of the modified eyepiece shown in FIG. 2.

FIG. 5 shows in perspective a view of the modified eyepiece 16 having a housing 40 and an annular adjustment 41 fixedly coupled to the beam splitter 28 and rotatable relative to the housing 40, so as to rotate the entry aperture 27 of the beam splitter 28. A pair of locking screws 42, of which one only is shown in the figure, allows for the beam splitter 28 to be fixed relative to the housing 40 so that it cannot be inadvertently rotated. Fixedly mounted with respect to the entry aperture 27 of the beam splitter 28 is a housing 43 for accommodating therein the imaging lens 24, the folding prism 25 and the collimating lens 26 and having at an end thereof a mount 44 for fixing the LCD 23 thereto.

Figure 6:
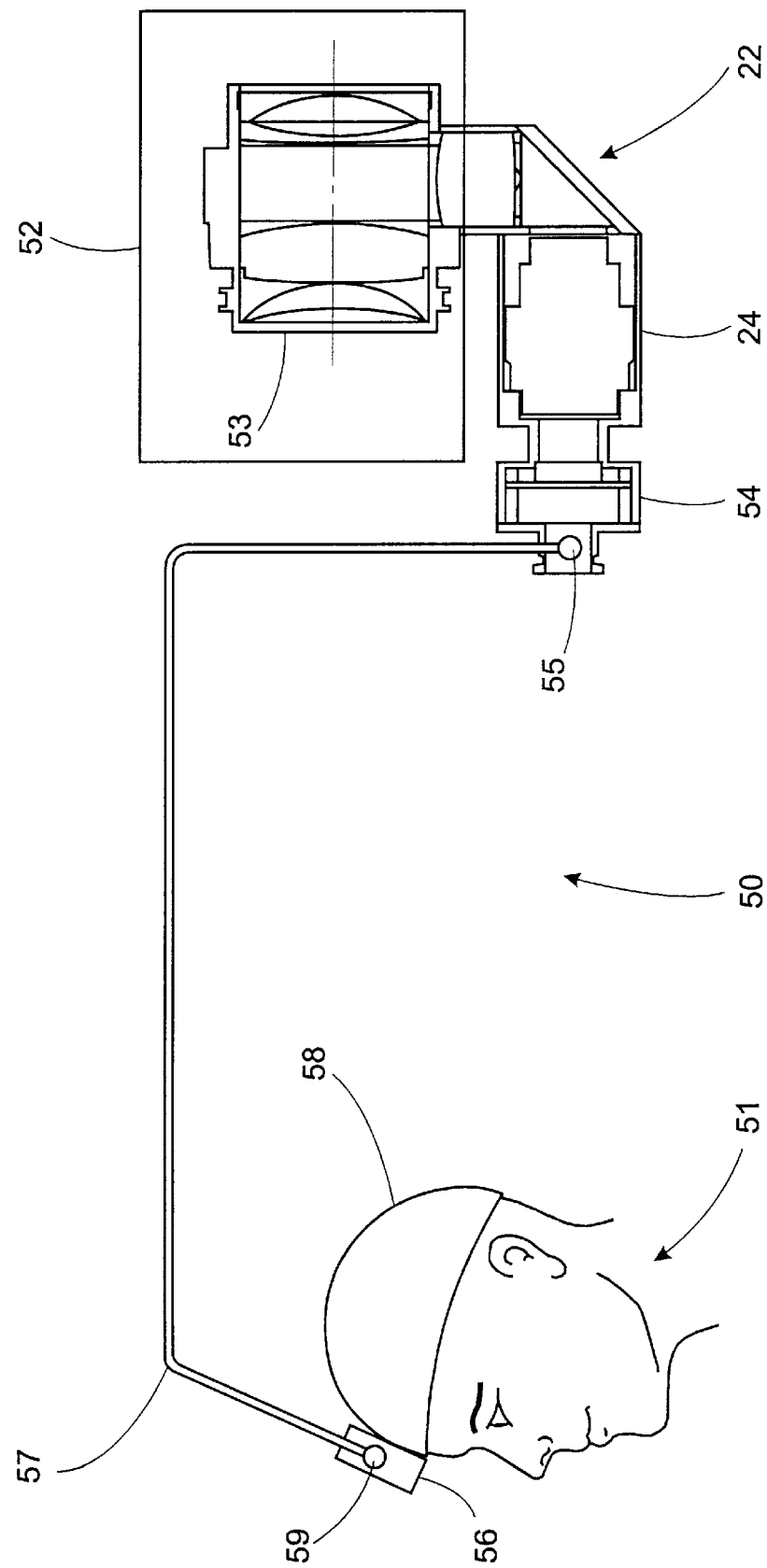
FIG. 6 is a schematic diagram of an optical system employing a modified Night Vision Goggles according to the invention for directing an image produced thereby to an external observer.

FIG. 6 is a schematic diagram of an optical system 50 employing the modified Night Vision Goggles according to the invention for directing an image produced thereby to an external observer 51. The system 50 comprises a Night Vision Goggles 52 having mounted in at least one eyepiece 53 thereof the combiner 22 as described in detail above with reference to FIG. 5 of the drawings. A miniature LCD 54 is fixed to the mount 44 of the combiner 22 so as to lie in the focal plane of the objective 31 which captures the diffused image produced by the LCD 54 and produces a collimated entry beam.

The LCD 54 is provided with a socket 55 (constituting a video coupling means) for coupling thereto a video processor 56 (constituting a video processing means) which is responsive to a desired video data signal for generating a standard video image signal conforming to a predetermined standard video format. The socket 55 includes both video and electrical power connections and is coupled to the video processor 56 by means of a multi-core cable 57 which includes both video and power cores thus enabling both electrical power as well as the video signal to be fed to the LCD 54 using the same cable.

The external observer 51 wears a helmet shown schematically as 58 having mounted on both sides thereof a matching socket 59 for coupling the cable 57 thereto so that electrical power can be fed to appropriate connections in the socket 59 so as to provide electrical supply to the LCD 54 and, at the same time, allow for the video output from the video processor 56 to be fed to the LCD 54. The socket 59 thus constitutes a video and power supply coupling means which, because only a single cable connection to both coupling means is required, allows for quick connection and release. Furthermore, by providing paired sockets 59 on opposite sides of the helmet 58, the cable 57 may be connected to either side of the helmet 58, thus making the connection and release equally convenient for both right and left handed personnel.

It is to be noted that the invention contemplates within its scope a Night Vision Goggles adapted for stereoscopic use and a system for use therewith by mounting a pair of combiners as described, one in each eyepiece. of the Night Vision Goggles.

It will be appreciated that the dimensions of the eyepiece shown in FIG. 3 are by way of example only. In practice, different eyepieces must be customized for mounting therein the combiner, but the customization is not itself a feature of the invention and is well within the scope of an optical engineer. It is also to be noted that not all eyepieces lend themselves to adaptation. In this case, the combiner may be mounted in a suitable eyepiece which is then substituted for the original eyepiece of the Night Vision Goggles.

Although the invention has been described with particular reference to a combiner for use with Night Vision Goggles, these are merely an example of an optical device having a finite conjugate. The principles of the invention are equally well suited to other such devices.

Likewise, the LCD is described as a particular implementation of an illumination sub-unit, it being understood that any display or image source may be substituted therefor.

What is claimed is:

1. For an optical eyepiece containing therein at least two optical elements and which is adjusted for viewing a first image, a combiner for injecting a non-collimated light beam from a second image substantially along an optical axis of the eyepiece so as to present a combined image to an observer, said combiner comprising a beam splitter for inserting into the eyepiece between said at least two optical elements and having an entry aperture for intercepting the non-collimated light beam and directing a portion thereof outside the eyepiece so as to superimpose the second image on the first image.

2. The combiner according to claim 1, wherein the beam splitter is asymmetrical and is inserted into a restricted space between the pair of optical elements in the eyepiece so as to inject said portion of the light beam over a reduced field of view whilst not reducing a field of view of the light beam passing through both of said optical elements of the eyepiece.

3. The combiner according to claim 2, further including optical correction means for correcting for optical distortions produced consequent to inserting the beam splitter into the eyepiece.

4. The combiner according to claim 1, further including:
    an objective lens for intercepting and collimating the non-collimated beam so as to produce a collimated entry beam,
    optical folding means for intercepting and folding the collimated beam through 90° so as to produce a folded and collimated entry beam, and
    an imaging lens disposed intermediate the objective lens and the entry aperture of the beam splitter for focussing said folded and collimated entry beam so as to produce a non-collimated entry beam.

5. The combiner according to claim 4, wherein an entry aperture of the beam splitter lies in a plane which is substantially normal to the optical axis of the eyepiece.

6. The combiner according to claim 4, wherein the second image is derived from an illumination sub-unit mounted in a focal plane of the imaging lens for producing said non-collimated light beam.

7. The combiner according to claim 6, wherein the illumination sub-unit is a miniature LCD.

8. The combiner according to claim 6, wherein the entry aperture of the beam splitter is below the eyepiece and the illumination sub-unit is dimensioned so as not substantially to obscure the observer's downward field of view.

9. The combiner according to claim 1, wherein the beam splitter is rotatably mounted with the eyepiece so as to permit rotation of the entry aperture of the beam splitter about the optical axis of the eyepiece.

10. The combiner according to claim 1, wherein the eyepiece is a component in a Night Vision Goggles.

11. The combiner according to claim 1, being integral with the eyepiece.

12. The combiner according to claim 1, wherein the first and second images are of different color spectra and a dichroic coating is applied to the beam splitter in order that the beam splitter be fully transparent to the first image and fully reflective to the second image.

13. An optical system including at least one eyepiece having coupled thereto the combiner according to claim 1.

14. The optical system according to claim 13, for producing a stereoscopic image which is directed to the observer, wherein said optical system includes two eyepieces, each propagating a non-collimated light beam therein and each having coupled thereto a said combiner.

15. An optical system comprising:
    a Night Vision Goggles having mounted in at least one eyepiece thereof for viewing a first image said eyepiece containing therein at least two optical elements,
    a combiner comprising a beam splitter for inserting into the eyepiece between said at least two optical elements and having an entry aperture for intercepting the non-collimated light beam and directing a portion thereof outside the eyepiece so as to superimpose the second image on the first image,
    optical correction means associated with the beam splitter for correcting for optical distortions produced consequent to inserting the beam splitter into the eyepiece,
    an objective lens for intercepting and collimating the non-collimated beam so as to produce a collimated entry beam,
    optical folding means for intercepting and folding the collimated beam through 90° so as to produce a folded and collimated entry beam,
    an imaging lens disposed intermediate the objective lens and an entry aperture of the beam splitter for focussing said folded and collimated entry beam so as to produce a non-collimated entry beam, and
    an illumination sub-unit mounted in a focal plane of the imaging lens for producing said non-collimated light beam.

16. The optical system according to claim 15, wherein the illumination sub-unit is a miniature LCD.

17. The optical system according to claim 15, wherein the illumination sub-unit is responsive to a predetermined video format for producing said second image and is provided with a video coupling means for coupling a video processing means thereto which is responsive to an image data signal for generating a standard video image signal conforming to said predetermined video format.

18. The optical system according to claim 17, wherein the video coupling means is coaxial with a power supply coupling means for providing electrical power to the illumination sub-unit via a single cable having therein respective video signal and electrical supply cores.

19. The optical system according to claim 18, wherein the video and power supply coupling means are mounted on a helmet worn by the observer.

20. The optical system according to claim 19, wherein a pair of video and power supply coupling means are mounted on opposite sides of said helmet so as to allow said cable to be connected to either side of the helmet depending on whether the observer is right or left handed.

21. The optical system according to claim 17, wherein the illumination sub-unit is mounted on a helmet worn by the observer.

22. The optical system according to claim 15, wherein the beam splitter is rotatably mounted with the eyepiece so as to permit rotation of the entry aperture of the beam splitter about the optical axis of the eyepiece.

23. The optical system according to claim 15, wherein the first and second images are of different color spectra and a dichroic coating is applied to the beam splitter in order that the beam splitter be fully transparent to the first image and fully reflective to the second image.

* * * * *